3,464,948
SYSTEM FOR OBTAINING FILLED VINYL ACETATE-EPOXY RESINS

Donald H. Russell, Cherry Hill, N.J., assignor to Atlantic Richfield Company, Philadelphia, Pa., a corporation of New York
No Drawing. Filed Oct. 28, 1966, Ser. No. 590,208
Int. Cl. C08g 45/04; C08f 29/30
U.S. Cl. 260—30.4         10 Claims

ABSTRACT OF THE DISCLOSURE

Filled vinyl-epoxy compositions of high impact strength and controlled porosity which do not deform prior to curing are prepared by first preparing a dry mixture of a vinyl acetate polymer and filler, adding a volatile organic solvent to the dry mixture, separately preparing a mixture of an epoxy resin, plasticizer and curing agent and then mixing the separately prepared mixture with the solvent containing dry mixture and then controlling the rate of solvent removal in the resultant admixture prior to and during the cure.

---

This invention relates to a method for producing filled vinyl-epoxy resins which do not deform prior to curing and wherein the porosity of such resins can be controlled to various desired levels.

It is art recognized that filled epoxy moldings lack green strength and must therefore be cured in relatively expensive molds. Since removal of the cured material from the mold can only be accomplished when proper geometries are available, the number of castable shapes is limited. Accordingly, a means of obtaining epoxy materials with high green strength which would not require molds for curing has long been a desideratum of the art.

The addition of a vinyl acetate polymer to an epoxy resin could provide a relatively inexpensive means of improving the impact strength of epoxy resins without decreasing its heat distortion temperature.

However, vinyl acetate polymers and epoxy resins are normally incompatible—separating into two distinct phases upon compounding.

Therefore it is an object of the present invention to produce an epoxy resin material which has high green strength and can be handled prior to curing without deformation.

Another object of the present invention is to produce a compatible, homogeneous mixture of vinyl acetate polymer and epoxy resin having impact strength.

It has been discovered that these and other objects are obtained by the process of the present invention which has the additional advantage of permitting the porosity of filled vinyl-epoxy resins to be controlled to various desired levels.

In accordance with the present invention, a dry blend of filler and vinyl acetate polymer is prepared. A volatile organic compound which is a strong solvent for the vinyl acetate polymer is then added to the resulting dry blend of filler and polymer. A mixture of epoxy resin, plasticizer and curing agent is prepared separately and added to the solvent-containing dry blend of filler and polymer. The filler particles are thus first coated with the vinyl acetate polymer from solution and secondly by the epoxy resin with a co-compatibilizing plasticizer thereby forming an epoxy-vinyl solution in situ on the surface of the filler particles. If the uncured system is allowed to stand at room temperature for an extended period of time or if the system is heated below its curing temperature for a short period of time, the resulting material is dense and non-porous. However, if the green molded object is immediately cured the solvent expands to form pores and a porous structure is produced. By controlling the amount of volatile solvent in the mixture prior to curing and also controlling the rate of solvent removed, controlled porosity can be obtained.

The fillers utilized in the practice of this invention may be any relatively chemically inert filler which does not react with the vinyl acetate polymer, such as wood flour, silica, slate dust, limestone, alumina, etc. The filler may be present in amounts such that the resulting filled material contains over 90% by weight of filler. Normally, the upper limit for the filler is about 66 volume percent. Provided filler is present, there is no minimum amount of filler which must be used.

The vinyl acetate polymer comprises either polyvinyl acetate or a vinyl chloride-vinyl acetate copolymer. The molecular weight of such polymers normally ranges between about 5500 and about 60,000. Preferably, a copolymer of vinyl chloride and vinyl acetate containing between about 5 and about 20% by weight of vinyl acetate is employed since polymers having high vinyl acetate contents tend to have somewhat low softening points and poor heat stability.

Volatile organic solvents which may be utilized in this invention include any volatile organic solvent which has an appreciable vapor pressure at room temperature. Such solvents include tetrahydrofuran, methylethylketone, butyl acetate, etc. Usually, sufficient solvent is added to the dry blend of filler and vinyl acetate polymer to dissolve the polymer, although a greater or lesser amount may be employed if desired. As previously mentioned, porosity of the filled vinyl acetate polymer—epoxy resin is achieved by controlling both the amount of solvent present and its rate of removal.

The epoxy resins utilized in this invention are polymeric materials having a terminal epoxy group, an epoxide equivalent in the range of about 175 to about 335 and molecular weights as high as 8000. However, it is preferable to utilize an epoxy resin having a molecular weight ranging from about 350 to about 1000. Such resins are well-known and range from resins which are liquid at room temperature to those which have a melting point of about 75° C. These resins may be prepared by reacting a polyhydroxy alcohol with an epihalohydrian as described in Kirk-Othmer Encyclopedia of Chemical Technology, first supplement volume (1957), pages 312 to 328, which publication is incorporated by reference into the specification. A preferred epoxy resin is one formed by reacting bisphenol-A with epichlorohydran.

The selection of the particular plasticizer employed is dependent upon the processing conditions utilized and the properties desired in the final composition. For example, if low temperature properties are required in the composition, monomeric plasticizers such as the esters of dicarboxylic acids may be used. Examples of these esters include dibutyl phthalate, dioctyl phthalate and diisodecyl phthalate. If the compounding and curing temperatures are low, then the more volatile plasticizers such as dimethyl phthalate are suitable. However, regardless of the processing conditions or final properties desired, the plasticizer selected must be compatible with the vinyl acetate polymer and the epoxy resin. Because of its low volatility and excellent compatibility, dibutyl phthalate is preferred. The plasticizer loading is also dependent upon the particular properties desired in the final composition. Normally, amounts ranging from about 5 to about 60 parts by weight per 100 parts of vinyl acetate polymer will suffice. Preferably, the plasticizer is present in amounts ranging from about 10 to about 35 parts by weight per 100 parts of vinyl acetate polymer.

The choice of curing agent is limited by two separate criteria. First, the activation temperature of the curing agent must be sufficiently higher than the compounding temperature in order to eliminate premature activation during compounding. Secondly, the activation temperature must be low enough to allow the final composition to undergo a complete curing cycle without appreciable degradation of the vinyl polymers. These degradation limits are determined by the amount of vinyl acetate in the composition and hence the corresponding compounding and curing temperatures must be determined from these criteria. Aromatic diamines and aromatic acid anhydrides lead to higher tensile strength and use temperatures but lower elongation and lower impact strength. Aliphatic amines and aliphatic polyamines increase elongation and impact strength but decrease use temperature and tensile strength. For compounds which are processed at temperatures ranging from about 325 to about 350° F., dicyandiamide having an activation temperature of 375° F. has been found to be particularly suited for use in this invention. Excellent properties can also be developed at lower cure temperatures using 2-ethyl-4-methyl imidazole. For compounds processed at higher temperatures, metaphenylene diamine is particularly preferred. The amount of curing agent required is dependent upon the amount of epoxy resin present and normally ranges from about 1 to about 10 parts per 100 parts by weight of epoxy resin.

Depending on desired characteristics, such as tensile strength and elongation properties, practically any ratio of the vinyl acetate polymer and epoxy resin may be used. Normally, however, the epoxy resin is utilized in amounts ranging from about 5 to about 100 parts per 100 parts by weight of vinyl acetate polymer.

Provided the specified order of addition is maintained and conditions are avoided which would lead to premature solvent evaporation, the compositions of this invention may be prepared using any of the art recognized methods suitable for compounding such materials. For example, these compositions may be prepared in mixers, extruders, mills, calenders, Banburies and other compounding equipment. Furthermore, ingredients commonly added to vinyl acetate polymers or epoxy resins to retain or enhance the basic polymer properties may be incorporated into the compositions of this invention in functional amounts without departing from the scope of this invention. Examples of these ingredients include heat and ultra-violet light stabilizers, secondary plasticizers, anti-blocking agents, impact improvers, lubricants, pigments, etc. Curing can be accomplished by the methods used for epoxy resins.

The invention will be illustrated by the following specific examples, it being understood that there is no intention to be necessarily limited by any details thereof since variations may be made within the scope of the invention.

Example I (a) A dry blend is prepared by mixing 1000 parts by weight of silica with 60 parts by weight of a vinyl chloride-vinyl acetate copolymer containing about 15 weight percent vinyl acetate. Approximately 130 parts by weight of tetrahydrofuran is then added to the resulting dry blend.

(b) A mixture of 40 parts per weight of Epon 828 resin, 4.5 parts by weight of metaphenylene diamine and 20 parts by weight of dibutyl phthalate is prepared separately. (Epon 828 resin is a bisphenol A-epichlorohydrin resin which has a viscosity of 100 to 160 poises at 25° C. and an epoxide equivalent of 180 to 195 (grams of resin containing 1 gram equivalent of epoxide). Other properties for the Epon 828 resin include a density at 20° C. of 1.168 g./ml.; a refraction index at 25° C. of between 1.570 to 1.575; a flash point (tag open cup) of 175° F.; a hydroxyl content of 0.06 equivalence of OH/100 grams of resin; an average molecular weight of 380 and an equivalent weight of 85.)

Separately prepared mixture (b) is then added to the ingredients in mixture (a). The resulting mastic can be molded at room temperature into shaped objects which have good green strength and cure to hard impact-resistant objects in one hour at about 375° F.

By controlling the amount of volatile solvent left in the mix prior to curing, porosity can be varied. As the solvent expands in the product to form pores, the resin cures to the B-stage to stabilize the pores and a porous structure is obtained. The resulting porous material may be used as a filtration medium or as a high-strength equivalent of cinder blocks.

Example II

Repeating Example I using dicyandiamide in place of metaphenylene diamine, a dense and non-porous product is obtained upon ultimate curing by either: (1) allowing the uncured system to stand at room temperature for about eight hours or by (2) heating the uncured system below 176° F. for about 10 minutes prior to final curing. The ultimately cured product may be used in such applications as drop hammer dies for short run production, acid-proof building blocks, grinding wheels and stair treads.

The use of vinyl acetate polymers with epoxy resins provides a relatively inexpensive method for improving the impact strength of epoxy resins which at the same time does not decrease the heat distortion temperature of the epoxy resin. For example, a brick made from 10% of a 50–50 vinyl-epoxy blend and 90% by weight of 200-mesh sand as a filler in accordance with the present invention rebounded elastically when dropped from a height of 15 feet. A similar block made from straight epoxy resin broke when dropped from a height of 15 feet.

Thus, a filled vinyl acetate-epoxy material may be prepared in accordance with the present invention which has sufficient green strength to permit handling without deforming prior to curing. This means that the number of castable shapes for such material is not limited by mold configuration. Moreover, the homogeneous mixture is obtained in a normally incompatible system. In addition, porosity of the filled material can be controlled by regulating the amount of solvent and its rate of removal—allowing one to obtain a variety of final products ranging from a porous material to a dense and non-porous ultimate product.

Obviously, many modifications and variations of the invention as hereinbefore set forth may be made without departing from the spirit and scope thereof.

What is claimed is:

1. A process for producing filled vinyl-epoxy material of high impact strength which does not deform prior to curing, which process comprises: preparing a dry mixture of a filler with vinyl acetate polymer having a molecular weight ranging between 5500 and 60,000; adding a volatile organic solvent to said dry mixture; separately preparing a mixture of an epoxy resin, said resin prepared by reacting a polyhydroxy alcohol or phenol with an epihalohydrin and having an epoxy equivalent in the range of from 175 to 335, with a plasticizer and curing agent; and mixing the separately prepared epoxy mixture with the solvent-containing vinyl mixture and controlling the rate of solvent removal in the resulting admixture.

2. The process as in claim 1 wherein the vinyl acetate polymer is selected from the group consisting of a vinyl chloride-vinyl acetate copolymer and polyvinyl acetate.

3. The process as in claim 1 wherein the filler is present in an amount of less than about 66 volume percent.

4. The process as in claim 1 wherein the organic solvent is selected from the group consisting of tetrahydrofuran, methylethylketone and butyl acetate.

5. The process as in claim 1 wherein the epoxy resin has an epoxide equivalent of between 175 and 335.

6. The method of producing a porous, filled vinyl-epoxy material, which method comprises: preparing a dry blend of a filler and a vinyl acetate polymer having a molecular weight ranging between 5500 and 60,000 selected from the group consisting of a vinyl chloride-vinyl acetate copolymer and polyvinyl acetate; adding a volatile organic solvent to said dry blend; separately preparing a mixture of an epoxy resin, said resin prepared by reacting a polyhydroxy alcohol or phenol with an epihalohydrin and having an epoxide equivalent of between 175 and 335, with a plasticizer and a curing agent; adding the separately prepared epoxy mixture to the solvent-containing vinyl blend and immediately curing the resulting mixture.

7. The method as in claim 6 wherein the vinyl acetate polymer is a vinyl chloride-vinyl acetate copolymer containing between 5 and 20% by weight of vinyl acetate.

8. The method as in claim 6 wherein the plasticizer is present in an amount of between 5 to 60 parts per 100 parts by weight of vinyl acetate polymer.

9. The method as in claim 6 wherein the curing agent is present in an amount of between 1 to 10 parts per 100 parts by weight of the epoxy resin.

10. The method as in claim 6 wherein the epoxy resin is present in an amount of between 5 to 100 parts per 100 parts by weight of vinyl acetate polymer.

References Cited

UNITED STATES PATENTS

| | | | |
|---|---|---|---|
| 3,251,786 | 5/1966 | Edmunds | 260—37 |
| 3,288,618 | 11/1966 | De Vries | 260—37 |
| 3,321,550 | 5/1967 | Hardman et al. | 260—30.4 |
| 3,345,322 | 10/1967 | Smith | 260—41 |

MORRIS LIEBMAN, Primary Examiner

L. T. JACOBS, Assistant Examiner

U.S. Cl. X.R.

260—34.2, 37, 837